United States Patent [19]

Hamaekers et al.

[11] Patent Number: 5,178,375
[45] Date of Patent: Jan. 12, 1993

[54] RUBBER BUSHING THAT SUPPRESSES VIBRATIONS HYDRAULICALLY

[75] Inventors: Arno Hamaekers, Gorxheimertal; Arnold Simuttis, Bad Kreuznach, both of Fed. Rep. of Germany

[73] Assignee: Firma Carl Freudenberg, Weinheim, Fed. Rep. of Germany

[21] Appl. No.: 792,333

[22] Filed: Nov. 13, 1991

[30] Foreign Application Priority Data

Dec. 8, 1990 [DE] Fed. Rep. of Germany ....... 4039228

[51] Int. Cl.$^5$ ............................................. F16M 1/00
[52] U.S. Cl. ................................ 267/140.12; 267/219; 267/141.2
[58] Field of Search ................. 267/140.1 C, 140.1 R, 267/35, 141.1, 141.2, 219; 248/550, 562, 636

[56] References Cited

U.S. PATENT DOCUMENTS

| 4,700,934 | 10/1987 | Andia et al. | 267/140.1 C |
| 4,768,760 | 9/1988 | LeFol | 267/140.1 C |
| 4,822,010 | 4/1989 | Thom | 267/140.1 C |
| 4,840,359 | 6/1989 | Hamaekevs et al. | 267/140.1 C |
| 4,895,353 | 1/1990 | Roth et al. | 267/35 |
| 4,982,938 | 1/1991 | Brenner | 248/562 |

Primary Examiner—Robert J. Oberleitner
Assistant Examiner—Chris Schwartz
Attorney, Agent, or Firm—Sprung Horn Kramer & Woods

[57] ABSTRACT

A rubber bushing that suppresses vibrations hydraulically, having a central longitudinal axis and being preponderantly subjected to loads in a direction perpendicular to its axis. The bushing comprises two axially coincident supporting sleeves arranged one inside the other and a rubber resilient element retained between the sleeves. The resilient element forms at least two essentially radially projecting webs having metal contact elements on the outer surfaces that rest against the inner surface of the outer supporting sleeve. The webs demarcate, in conjuction with the walls at each end of the sleeve and with the outer supporting sleeve, at least two working chambers that are full of fluid and communicate through connecting channels. The webs are resiliently compressed to less than their nominal size between the two retaining supporting sleeves. The ends of the webs are outwardly secured in the vicinity of the walls to mechanical rings demarcating, in conjuction with the outer supporting sleeve, annular channels that constitute part of the connecting channels. The annular channels, extending around each end of the resilient element, terminate at and conduct fluid into a working chamber inside the element. The annular channels communicate and conduct fluid through a straight channel that essentially parallels the longitudinal axis of the resilient element, diverges from axial to radial and opens into the annular channels at each end.

8 Claims, 8 Drawing Sheets

RUBBER BUSHING THAT SUPPRESSES VIBRATIONS HYDRAULICALLY

BACKGROUND OF THE INVENTION

The invention concerns a rubber bushing that suppresses vibrations hydraulically. The bushing, which is preponderantly subjected to loads perpendicular to its axis, comprises two axially coincident supporting sleeves arranged one inside the other and a rubber resilient element retained between the sleeves. The resilient element forms at least two essentially radially projecting webs having metal contact elements on the outer surfaces that rest against the inner surface of the outer supporting sleeve. The webs demarcate, in conjunction with the walls at each end of the sleeve and with the outer supporting sleeve, at least two working chambers that are full of fluid and communicate with each other through connecting channels. The webs are resiliently compressed to less than their nominal size between the two retaining supporting sleeves. The ends of the webs are outwardly secured in the vicinity of the walls to mechanical rings demarcating, in conjunction with the outer supporting sleeve, annular channels that constitute part of the connecting channels. The annular channels, extending around each end of the resilient element, terminate at and conduct fluid into a working chamber inside the element.

A bushing of this type is known from German patent publication No. OS 3 724 432. Its advantage is that, when it is subjected to load, the compressed webs prevent any significant tension in the resilient element. It is also possible to vary its suppression capacity by varying the geometrical dimensions of the annular channel at each end of the bushing. A long and slender channel, for example, is appropriate for suppressing low-frequency vibrations and two separate and parallel channels are appropriate for suppressing high-frequency vibrations.

The geometry of the fluid-conducting channels and hence the bushing's suppression curve cannot, however, be varied once the component has been installed and is in operation. Although some separate vibration frequencies can be suppressed with different embodiments of the known bushing, suppression of a wide range of frequencies is not possible. A lot of different-size bushings must accordingly be kept in stock, which is troublesome and expensive. Another drawback occurs when, for example, an extremely loosely mounted engine vibrates with a frequency as low as approximately 5 Hz. In such an event, the attainable rate of suppression is severely limited by the length of the annular channels around the bushing's circumference.

SUMMARY OF THE INVENTION

A principal object of the present invention is to provide an improved rubber bushing of the aforesaid type that will extensively suppress a wide range of low frequencies, beginning at the approximate vicinity of 5 Hz. It is intended that vibrations produced by very loosely mounted engines and ranging up to the natural resonance frequencies of the engine's crankshaft will be satisfactorily suppressed by the same device.

This object, as well as other objects which will become apparent from the discussion that follows, are achieved according to the invention by providing a rubber bushing of the aforesaid type wherein the annular channels communicate and conduct fluid through a straight channel that essentially parallels the longitudinal axis of the resilient element, diverges from axial to radial and opens into the annular channels at each end, and wherein the straight channel is created and demarcated by metal-reinforced rubber webs that constitute radial partitions on the resilient element. One advantage of this embodiment is that the two annular channels extending around each end of the resilient element constitute, in conjunction with the axial channel that opens into them, a very long overall fluid-conducting channel. Another advantage is that the overall channel can have a relatively extensive cross-section and can handle the relatively large volumes of fluid needed to effectively suppress low frequencies.

The partition in the radial section of the annular channel, extending at one end into the adjacent working chamber, can accommodate a one-way valve that allows fluid to flow into the chamber.

As an alternative to the one-way valve, a two-way valve can be accommodated in the radial section of the annular channel at each end. This valve can be realized by removing part of the reinforcement from the wall of the channel, allowing the pressure inside the channel, which is higher than the pressure in the compartment that accommodates the fluid, to deform the flexible wall and convey a mass of fluid. The flowing fluid will, in accordance with how much reinforcement is removed, control the extent of suppression over a specific range of frequencies. The valve alone will comparatively extend the range of frequencies that can be suppressed with this embodiment.

Another alternative is represented by a two-way valve in the annular channel at each end. The additional valve increases the suppression and extends it over a wider range of frequencies.

Again, a one-way valve that allows fluid to flow into the compartment can be accommodated at one end in the partition between the radial section of the annular channel and the adjacent working chamber and a two-way valve can be accommodated in the radial annular channel. The second valve at the same end as the first can lead to a shortcut for the purpose of suppressing higher-frequency vibrations too. The maximal suppression will, in this event, be slightly lower, a sacrifice for a substantially wider range.

Both ends of the bushing can have the same type, number, and distribution of valves. If all the valves are one-way and permit a downstream flow, their suppression properties can be varied to match the bushing's compression and vacuum phases. This feature can be augmented by using the same system of valves at the other end.

The annular channels that communicate with the working chamber can each comprise two parallel channel-like sections extending around the bushing and communicating through a hairpin channel that reverses the flow of fluid 180°, whereby the parallel channel-like sections are separated by prolongations of the partition that extend around the resilient element. This design results in very long channels with suppression properties that are satisfactory for low-frequency suppression. Elongating the bushing and thereby extending the hairpinned channels to almost any length is also conceivable.

Each parallel channel-like section can have a valve in the vicinity of the two working chambers to control the fluid's access to one compartment from both sections simultaneously. These valves provide satisfactory suppression over a wide and variable frequency range. Similar valves can be positioned at both ends of the bushing.

All of the valves hereintofore described can be either automatic or externally controlled. An automatic valve can, for example, comprise a slit in the resilient element that opens and closes with varying pressure and accordingly varies the suppression properties of the bushing. An externally controlled valve can be controlled, for example, by pins or disks that extend through the housing and preferably continuously vary the flow through the opening. Externally controlled revolving slides are also conceivable. When the controls are activated by an electric servo mechanism that intercepts signals from a program, for example, the bushing's suppression properties can be adjusted to the vehicle's current driving situation.

The preferred embodiments of the present invention will now be described with reference to the accompanying drawings.

DESCRIPTION OF THE PREFERRED EMBODIMENTS

Figure 1:
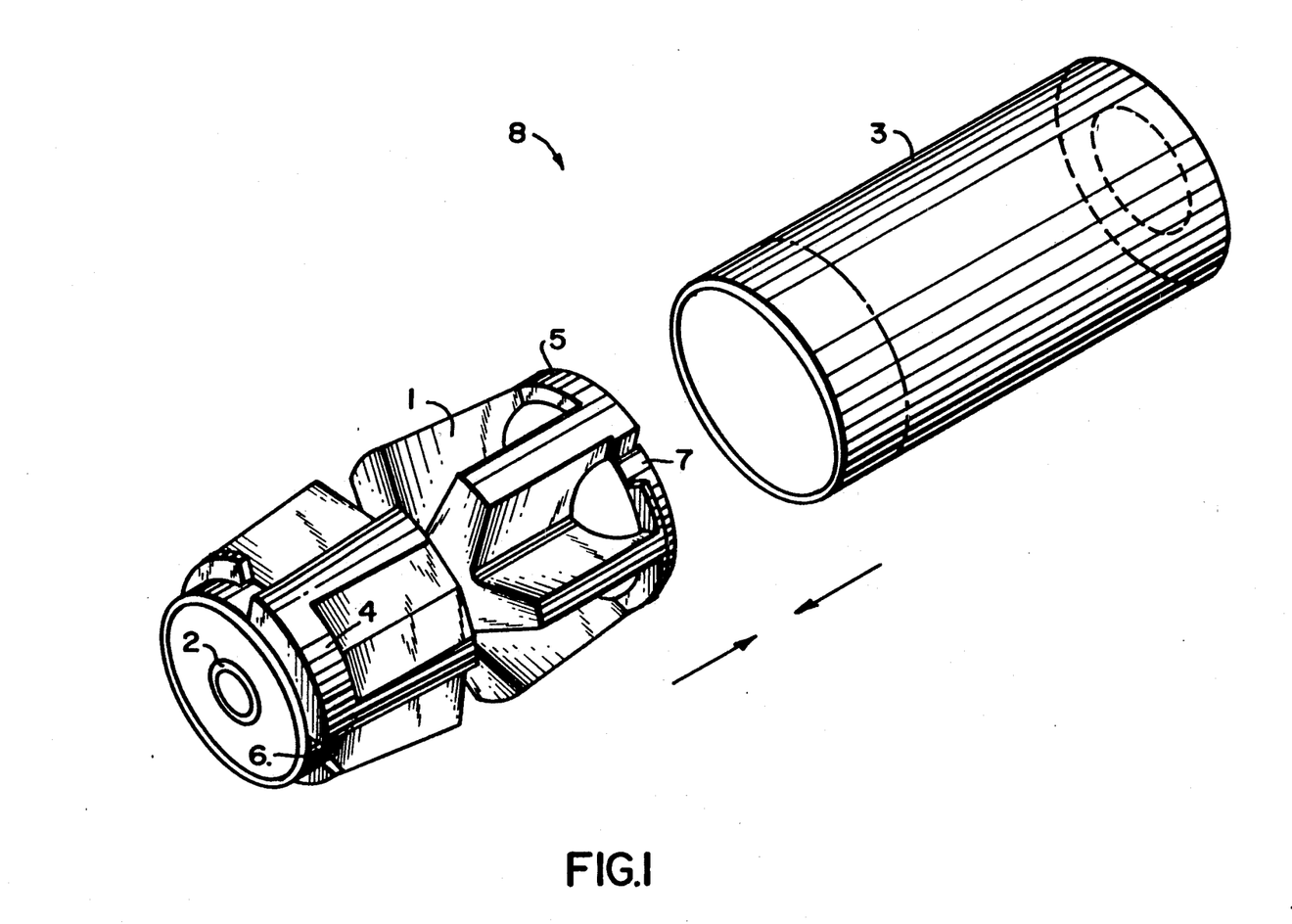
FIG. 1 is a perspective view of a rubber bushing that suppresses vibrations hydraulically in accordance with the invention with its outer supporting sleeve displaced off one end.

A rubber bushing 8 that suppresses vibrations hydraulically essentially comprises a resilient rubber element 1 compressed between an inner supporting sleeve 2 and an outer supporting sleeve 3, which is illustrated in FIG. 1 as being displaced. The element has an annular channel 6 and 7 at each end. It also has radial webs 4 and 5. The webs in the assembled bushing press against the inner surface of outer supporting sleeve 3. The resilient element as a whole will be squeezed between inner supporting sleeve 2 and outer supporting sleeve 3. A hydraulic fluid will be sealed tight inside the chambers formed between the compressed webs. The suppression properties of the bushing 8 in accordance with the invention depends upon the displacement of the fluid within the bushing from one chamber to another.

In FIGS. 1-6 the resilient element is shown as being partly cut away in the center, to better illustrate the cross-sectional profile of the element. In reality, the resilient element has substantially the same profile over the entire longitudinal extent of the working chambers.

Figure 2:
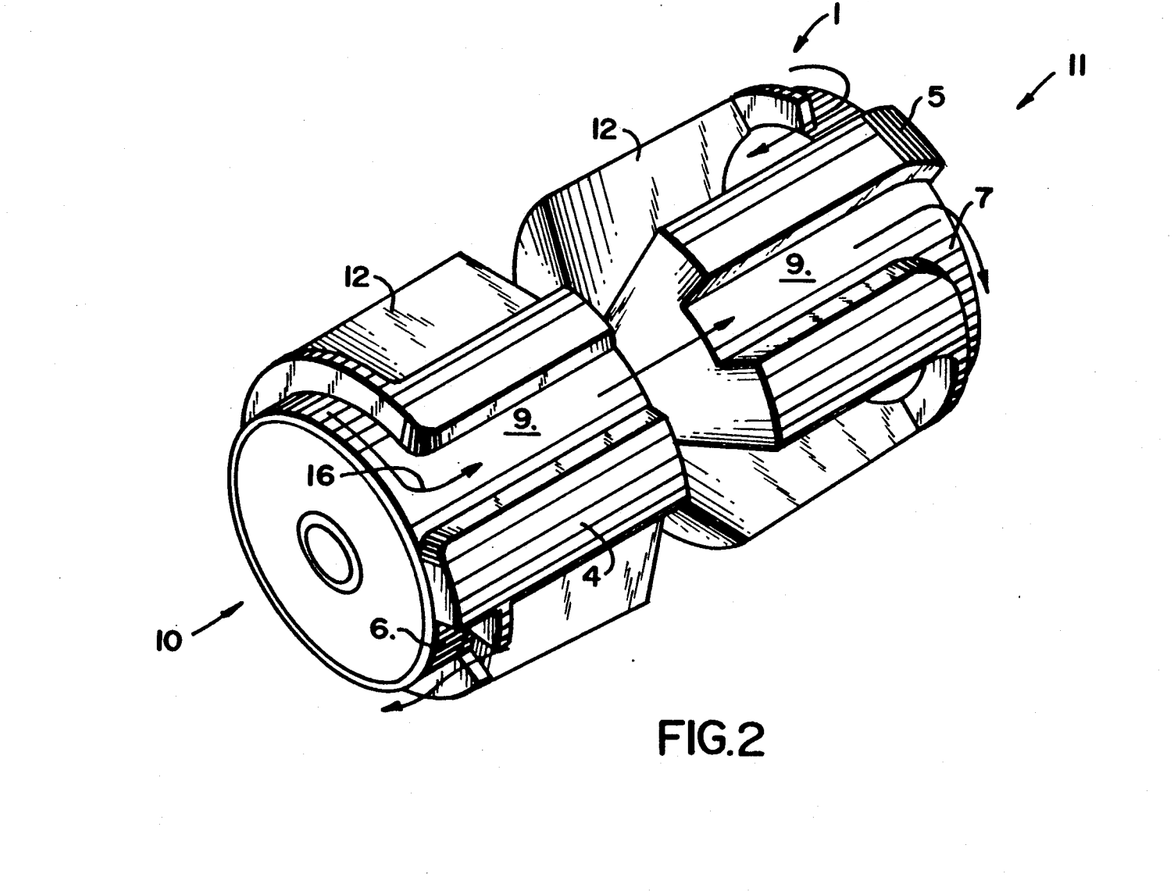
FIG. 2 is a perspective view of a resilient element that constitutes the major component of the bushing for an embodiment of the invention featuring very long annular channels.

The resilient element 1 illustrated in FIG. 2 has very long annular channels 6 and 7 without valves. Due to the long lengths of the channels 6 and 7 and their relatively large cross-section, this embodiment is effective for suppressing low-frequency vibrations, although within a relatively narrow range. The valves associated with the embodiments that will now be described will allow wider ranges of vibration to be suppressed.

Figure 3:
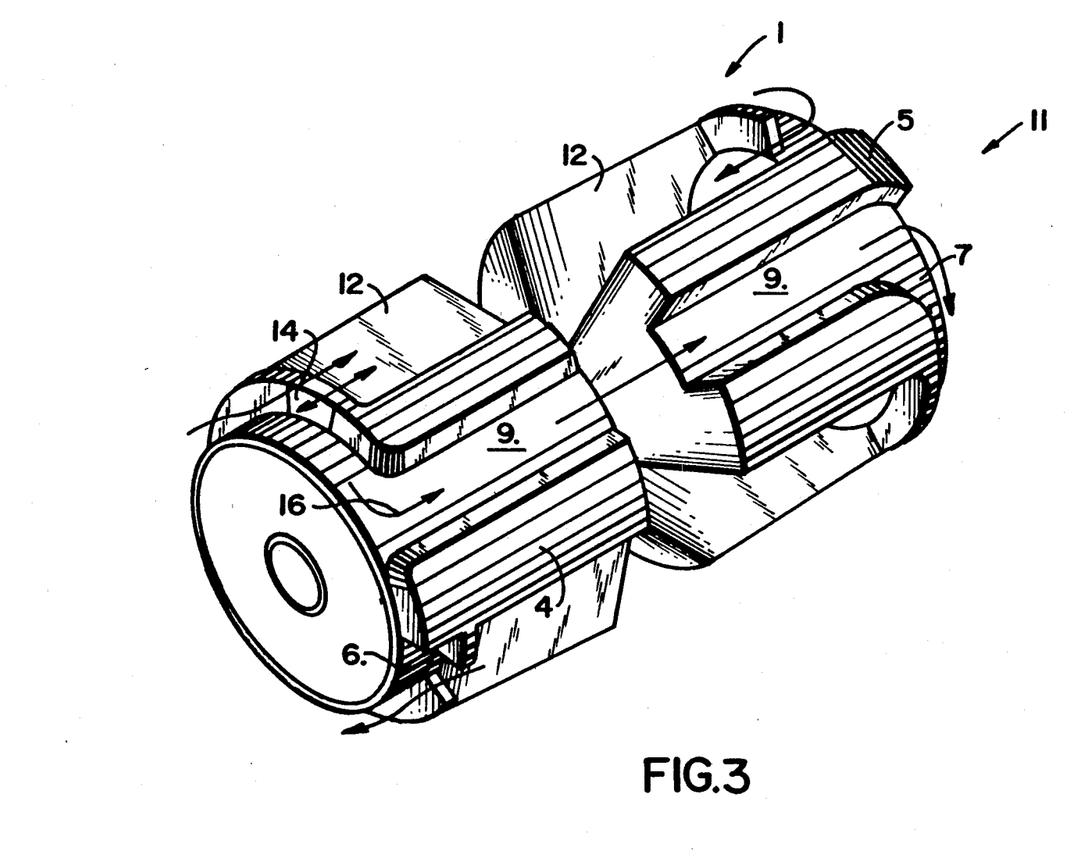
FIG. 3 is a perspective view of a resilient element of a bushing with a one-way valve in the partition between an annular channel and a working chamber.

The resilient element 1 illustrated in FIG. 3 incorporates a preferably one-way valve 14 in the partition between annular channel 6 and working chamber 12. A bushing accommodating such a valve element will be able to suppress a wide range of vibrations.

Figure 4:
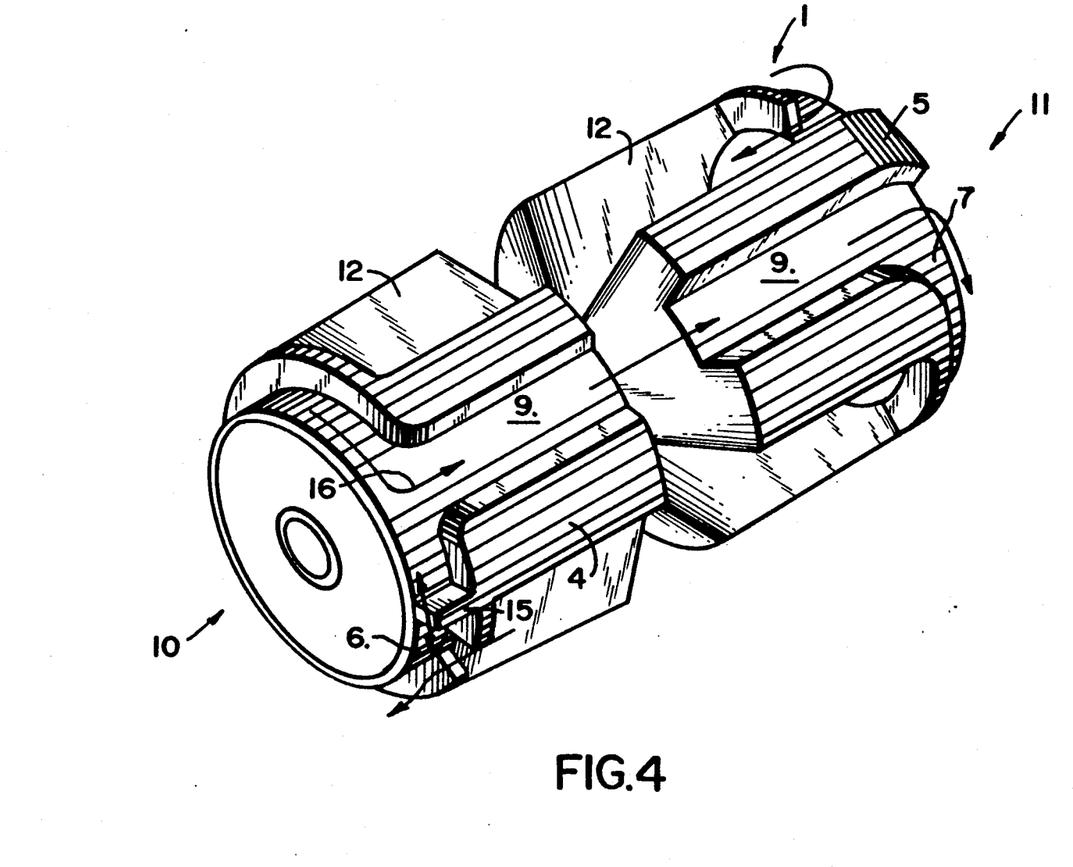
FIG. 4 is a perspective view of a resilient element of a bushing with a two-way valve.

The valve 15 employed in the resilient element 1 illustrated in FIG. 4 is two-way. The device's compression and decompression phases will both have the same suppression properties.

Figure 5:
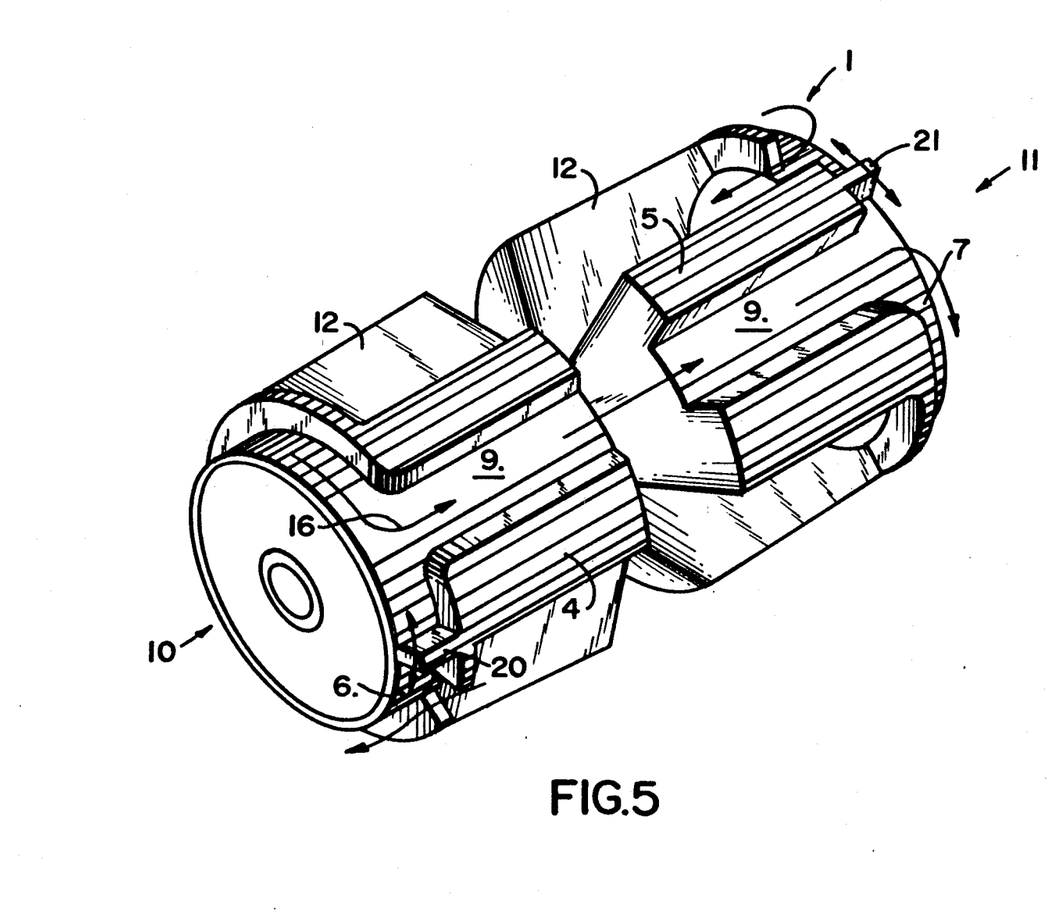
FIG. 5 is a perspective view of a resilient element of a bushing with a two-way valve at each end.

The resilient element 1 illustrated in FIG. 5 features a two-way valve 20 and 21 at each end 10 and 11, respectively. The bushing is employed to suppress higher frequencies. The additional valve 21 additionally extends the range of vibrations that can be suppressed.

Figure 6:
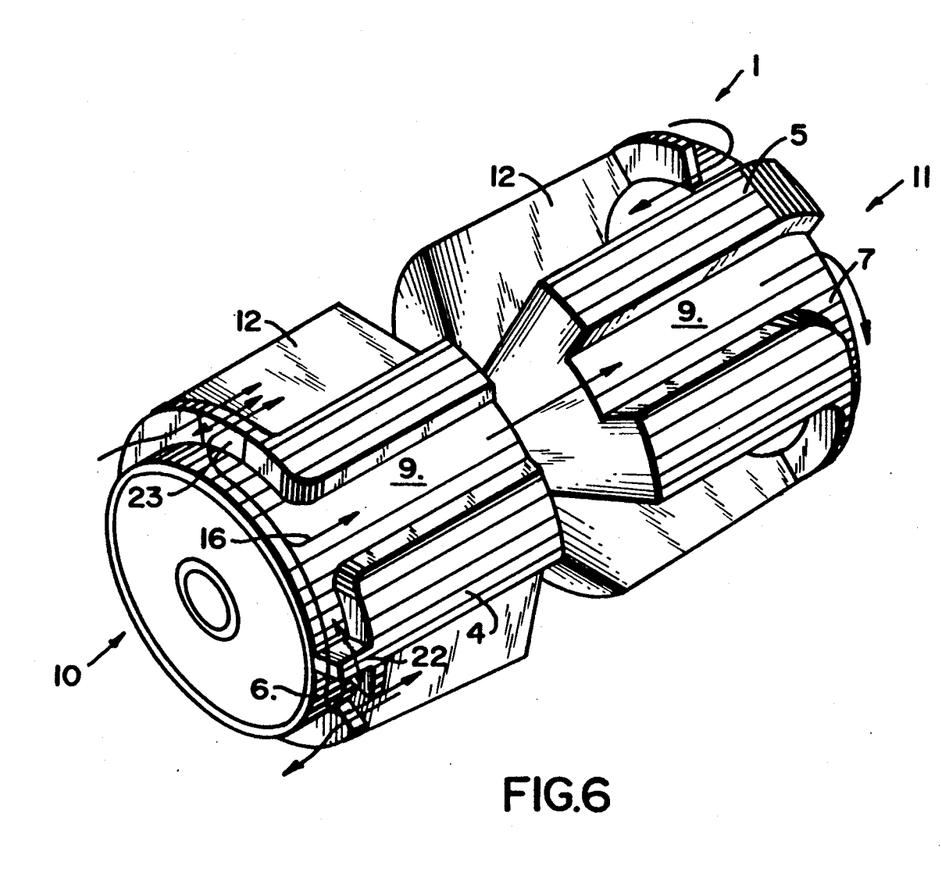
FIG. 6 is a perspective view of a resilient element of a bushing with two two-way valves at only one end.

The resilient element 1 illustrated in FIG. 6 has two two-way valves 22 and 23 positioned at one end 10. The two valves make it possible to select the vibrations to be suppressed by varying the distance traveled by the fluid. When valve 22 is open, it provides access to a shortcut between annular channel 6 and working chamber 12 for suppressing higher-frequency vibrations. The longer route traveled by the fluid when the valve is closed is employed for suppressing vibrations of lower frequencies. Such a design makes it possible to adapt the bushing to various applications.

Figure 7:
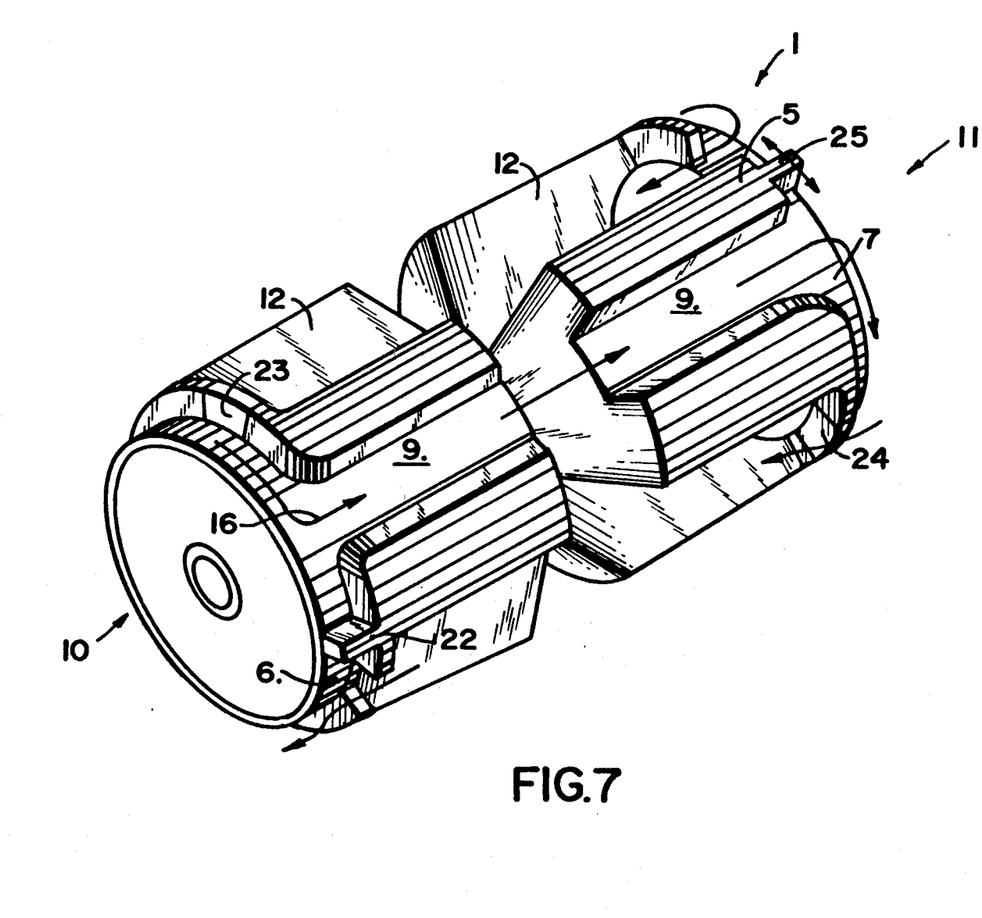
FIG. 7 is a perspective view of a resilient element of a bushing with two two-way valves at each end.

This advantage can be increased by adding similar valves 24 and 25 at the opposite end 11, as shown in FIG. 7. The range of vibrations that can be suppressed by such a bushing is accordingly maximized.

Figure 8:
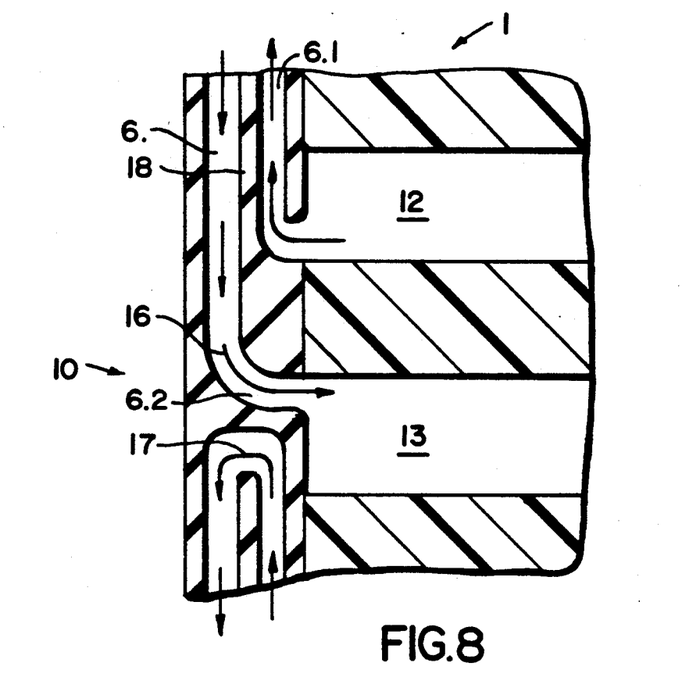
FIG. 8 is a developed view of part of a resilient element of a bushing with a hairpin channel.

Both working chambers 12 and 13 are apparent in FIG. 8, the latter being hidden in the views represented in FIG. 2 through 7. Fluid flows axially through the chambers, which communicate with an annular channel 6 comprising two channel-like sections 6.1 and 6.2. Since this embodiment lacks valves, it functions like the embodiment illustrated in FIG. 2.

Figure 9:
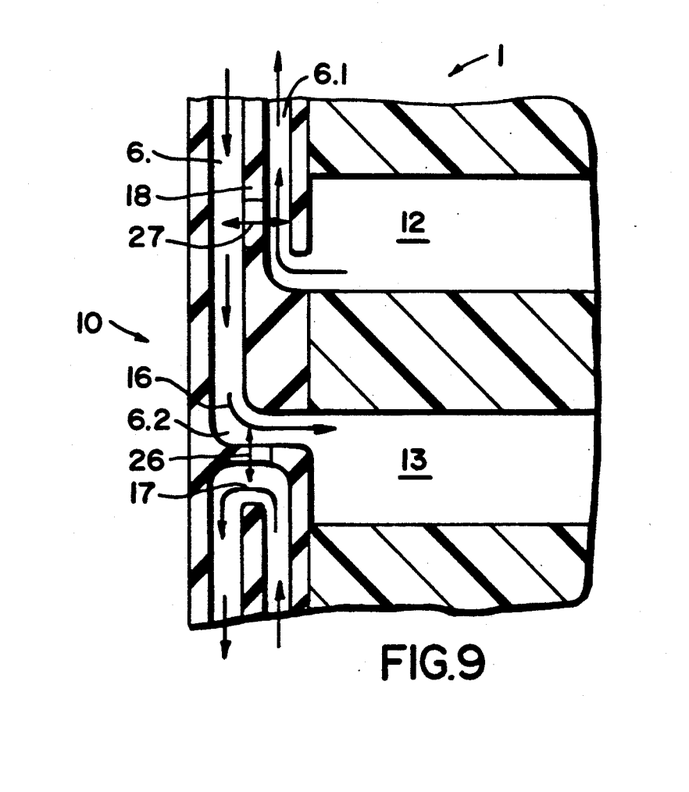
FIG. 9 is a developed view of part of a resilient element of a bushing with valves in the wall of the hairpin channel.

FIG. 9 illustrates an advanced version of the resilient element illustrated in FIG. 8. Two two-way valves 26 and 27 are accommodated in the partitions that demarcate annular channel 6 and in their prolongation 18. The two valves make it possible to vary the bushing's suppression properties. Structure and operation correspond to those described with reference to FIGS. 6 and 7. This particular embodiment has been demonstrated to be especially practical.

There has thus been shown and described a novel rubber bushing that suppresses vibrations hydraulically which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a rubber bushing that suppresses vibrations hydraulically, said bushing having a central longitudinal axis and being preponderantly subjected to a load perpendicular to said axis, said bushing comprising two axially coincident supporting sleeves arranged one inside the other and forming an inner sleeve and an outer sleeve, each sleeve having two opposite ends, and a resilient rubber element retained between the sleeves, said resilient element including at least two essentially radially projecting webs which demarcate, in conjunction with walls at each end of the sleeves and with the outer sleeve, at least two working chambers that are full of fluid and communicate through connecting channels, wherein the webs are resiliently compressed to less than their nominal size between the two retaining supporting sleeves, wherein ends of the webs are outwardly secured in the vicinity of the walls to mechanical rings demarcating, in conjunction with the outer sleeve, annular channels that constitute part of the connecting channels, and wherein the annular channels, extending around each end of the resilient element, terminate at and conduct fluid into a working chamber inside the element, the improvement wherein the annular channels communicate and conduct fluid through a straight channel that essentially parallels said longitudinal axis, diverges from axial to radial and opens into the annular channels at each end of the sleeves, and wherein the straight channel is created and demarcated by metal-reinforced rubber webs that constitute radial partitions in the resilient element.

2. The bushing as defined in claim 1, wherein the partition in the radial section of the annular channel extending at one end of the resilient element into the adjacent working chamber accommodates a one-way valve that allows fluid to flow into the chamber.

3. The bushing as defined in claim 1, wherein a two-way valve is disposed in the radial section of the annular channel at each end of the resilient element.

4. The bushing as defined in claim 1, wherein a two-way valve is disposed in the annular channel at each end of the resilient element.

5. The bushing as defined in claim 1, wherein a one-way valve that allows fluid to flow into the adjacent working chamber is disposed in one end in the partition between the radial section of the annular channel and this adjacent working chamber and wherein a two-way valve is disposed in the radial annular channel.

6. The bushing as defined in claim 5, wherein both ends of the bushing have the same type, number, and distribution of valves.

7. A bushing as defined in claim 1, wherein the annular channels that communicate with the working chamber each comprise two parallel channel-like sections extending around the bushing and communicating through a hairpin channel that reverses the flow of fluid 180°, whereby the parallel channel-like sections are separated by prolongations of the partition that extend around the resilient element.

8. A bushing as defined in claim 7, wherein each parallel channel-like section has a valve in the vicinity of the two working chambers to control the fluid access to one chamber from both sections simultaneously.

* * * * *